United States Patent
Dichtl (10) Patent No.: US 7,117,233 B2
(45) Date of Patent: Oct. 3, 2006

(54) RANDOM NUMBER GENERATOR AND METHOD FOR GENERATING A RANDOM NUMBER

(75) Inventor: Markus Dichtl, München (DE)

(73) Assignee: Infineon Technologies AG, Munich (DE)

( * ) Notice: Subject to any disclaimer, the term of this patent is extended or adjusted under 35 U.S.C. 154(b) by 626 days.

(21) Appl. No.: 10/611,065

(22) Filed: Jul. 1, 2003

(65) Prior Publication Data

US 2004/0010526 A1    Jan. 15, 2004

(30) Foreign Application Priority Data

Jan. 24, 2001 (DE) ............................... 101 03 071
Jan. 24, 2002 (WO) ..................... PCT/EP02/00732

(51) Int. Cl.
G06F 1/02 (2006.01)

(52) U.S. Cl. .................................................. 708/250

(58) Field of Classification Search ........ 708/250–256, 708/3
See application file for complete search history.

(56) References Cited

U.S. PATENT DOCUMENTS

| | | | |
|---|---|---|---|
| 4,176,399 A | | 11/1979 | Hoffmann et al. |
| 4,355,366 A | * | 10/1982 | Porter ........................ 708/255 |
| 4,545,024 A | * | 10/1985 | Maher et al. ................ 708/255 |
| 4,853,884 A | * | 8/1989 | Brown et al. .................. 708/3 |
| 4,855,690 A | | 8/1989 | Dias |
| 6,061,702 A | | 5/2000 | Hoffman |
| 6,195,669 B1 | * | 2/2001 | Onodera et al. ............... 708/3 |
| 6,571,263 B1 | * | 5/2003 | Nagai ............................ 708/3 |
| 6,993,542 B1 | * | 1/2006 | Meiyappan .................. 708/250 |

FOREIGN PATENT DOCUMENTS

WO    97/43709    11/1997

OTHER PUBLICATIONS

Petrie, C. et al.: "A Noise-Based Random Bit Generator IC for Applications in Cryptography", IEEE, 1998, pp. II-197 to II-200.
Dichtl, M. et al.: "A High Quality Physical Random Number Generator", Eurosmart Security Conference Proceedings, Marseille, 2000, 9 pages.

* cited by examiner

*Primary Examiner*—Tan V. Mai
(74) *Attorney, Agent, or Firm*—Laurence A. Greenberg; Werner H. Stemer; Ralph E. Locher (57) ABSTRACT

A random number generator includes a noise signal generating device for supplying a noise signal, a sampling device connected between an output of the noise signal generating device and an output of the random number generator and sampling the noise signal in a sampling state and not sampling the noise signal in an idle state. The random number generator further includes a control oscillator for supplying a control alternating signal, the frequency of the control alternating signal of the control oscillator not being rigidly coupled to the frequency of the noise signal. The random number generator further includes an enabling device which puts the sampling device in the sampling state when the noise signal or the signal derived from the noise signal is in a first trigger state, and when, subsequently, the control alternating signal of the control oscillator is in a second trigger state. This is to ensure that the frequency of the output samples of the random number generator depends on the frequency of the noise signal, whereas the phase position is determined by the frequency of the control oscillator. Thus, the frequency of the output samples can be set and adjusted to existing requirements in a simple manner using the frequency setting functionality of the noise signal generating device.

12 Claims, 3 Drawing Sheets

RANDOM NUMBER GENERATOR AND METHOD FOR GENERATING A RANDOM NUMBER

BACKGROUND OF THE INVENTION

1. Field of the Invention

The present invention relates to random number generators and in particular to random number generators that can be used in connection with cryptographic applications.

2. Description of the Related Art

There are many fields in the art where random numbers are needed. Some of these fields, for example, are simulations where random numbers are used so as to be able to simulate deterministic physical processes. By randomly changing various values of the simulation one can achieve that a simulation method which is "trapped" in a local maximum or minimum, becomes detached from this local maximum or minimum so as to perhaps succeed, eventually, in finding the global maximum or the global minimum.

Random numbers are also used for testing hardware or software. These random numbers are needed, if it is not possible to test all occurring digital signal vectors, to examine the system's performance/behavior in random signal vectors that have not been generated systematically.

A very important application for random number generators is cryptography. Modern cryptography methods are based on a random key which should be as long as the data to be encrypted. Their security is directly related to the randomness of the key. In general, key generation for cryptographic schemes should be based on random numbers, since random numbers are the only thing a potential attacker cannot guess. This is true both for symmetrical and for asymmetrical encryption methods. In most symmetrical encryption methods, sequences of randomly generated bits are used as keys. In asymmetric encryption methods, the structure of the keys is often more complex. For example, RSA keys are based on high prime numbers that must remain secret. Random numbers should be used for generating the prime numbers. They can be used, for example, to provide the starting number for a sequential search for prime numbers.

Further applications of random numbers as well as a general overview of the generation of random numbers are disclosed in "A High Quality Physical Random Number Generator", M. Dichtl and N. Janssen, Eurosmart Security Conference —Proceedings, Marseille, 2000, pages 277–278.

Figure 3:
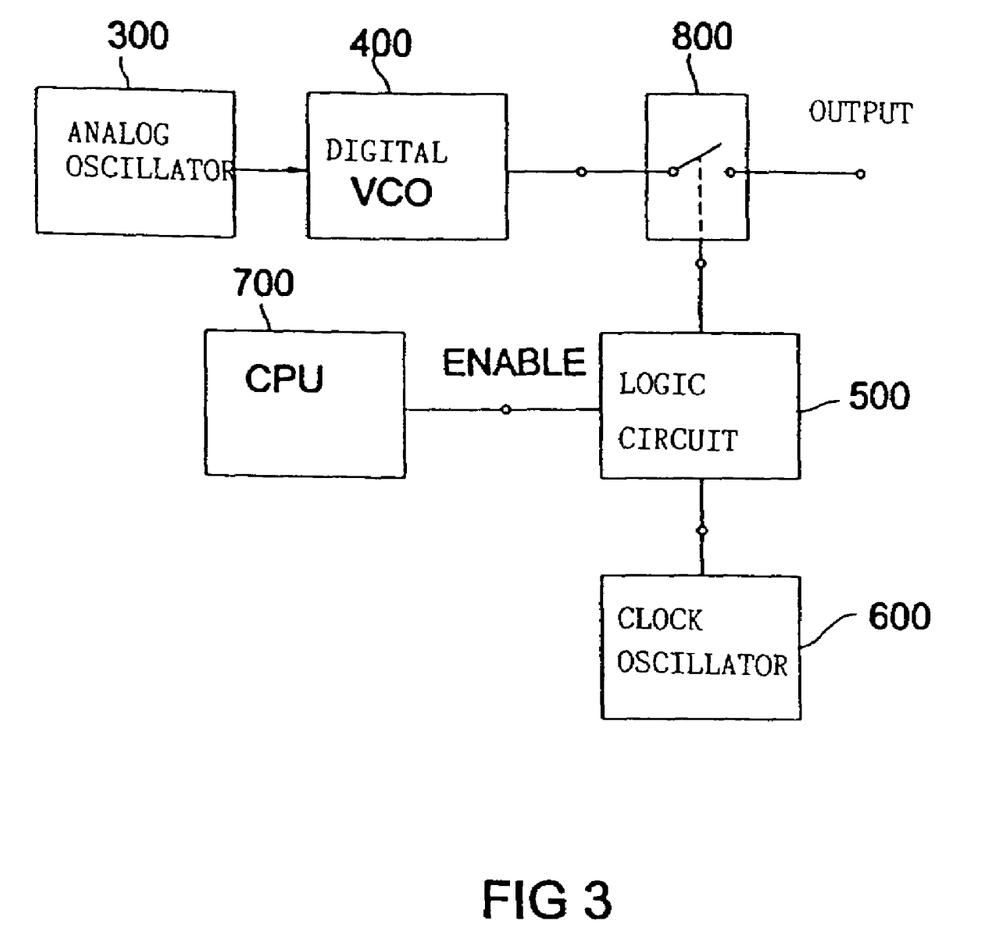
FIG. 3 shows a block diagram of a known random number generator.

U.S. Pat. No. 4,855,690 describes a random number generator which uses, as a basic parameter, samples of an output signal of an oscillator with variable frequency. Such a circuit is shown in FIG. 3. The random number generator includes an analog oscillator 300, a voltage-controlled digital oscillator 400, a logic circuit 500 which typically includes a flip-flop circuit, a clock oscillator 600, a central processing unit (CPU) 700, and a sampling device 800. Analog oscillator 300 generates a triangular signal which is fed into a control input of voltage-controlled digital oscillator 400. The sampling of the output signal of the voltage-controlled digital oscillator is effected by putting the sampling device in a sampling state by means of logic circuit 500. In the sampling state the current value of the output signal of VCO 400 is present at the output of the random number generator. In the idle state of the switching device, however, a signal is present at the output. The sampling device is then put into the sampling state by the logic circuit if two conditions are met. The first condition is that CPU 700 outputs an enable signal. The second condition is that the output signal of the clock oscillator exhibits a certain state, for example a rising edge. A chain of random output values is then generated when the CPU outputs the enable signal, which will be the case once the CPU has received the command to activate, i.e. to switch on, the random number generator. The frequency of the random values at the output of the random number generator corresponds exactly to the frequency of clock oscillator 600, since logic circuit 500 is arranged such that it drives, whenever the output signal of the clock oscillator is in a certain state, the sampling device 800 in such a manner that it supplies a sample at the output. However, this means at the same time that the frequency of the output values and/or temporal control of the sampling is independent of the frequency of analog oscillator 300 or of digital VCO 400. The output samples always exhibit the same frequency as the clock oscillator, it no longer being possible to determine the frequency of analog oscillator 300 and/or the frequency of digital VCO 400 in the sequence of samples at the output of the random number generator.

Not in all cases is it desirable that the frequency of the output samples be independent of the frequency of the analog oscillator and/or the voltage-controlled digital oscillator. The security of some applications, e.g. with payment cards, is jeopardized when the oscillator serving as a random source is sampled too often, so that the values obtained are strongly correlated. Such too frequent sampling might be intentionally caused by an attacker if he or she succeeds in increasing the frequency of clock oscillator 600. This threat is realistic in particular with chip card systems, as these frequently work with a clock which is fed in externally.

When the frequencies of oscillators 300 and 400 are raised, the sampling frequency, on the other hand, can also be raised, so that the existing resources are better utilized due to the higher data rate of the random number generation.

SUMMARY OF THE INVENTION

It is the object of the present invention to provide a random number generator, a method for generating a random number, or a smart card which utilize existing functionalities as much as possible but exclude a reduction in security due to too frequent sampling of the random source.

In accordance wit a first aspect of the invention, this object is achieved by a random number generator having: a noise signal generating device for supplying a noise signal; a sampling device connected between an output of the noise signal generating device and an output of the random number generator, the noise signal being sampled when the sampling device is in a sampling state, and the noise signal not being sampled when the sampling device is in an idle state; a control oscillator for supplying an alternating signal at a control oscillator output, the frequency of the alternating signal of the control oscillator not being rigidly coupled to the frequency of the noise signal; an enabling device having a first control input and a second control input and an output, the first control input being arranged to receive the noise signal or a signal derived from the noise signal, the second control input being arranged to receive the oscillator output signal or a signal derived from the same, an output signal being generatable at the output of the enabling device, by which output signal the sampling device is switchable from the idle state to the sampling state, and the enabling device being arranged to generate the output signal when the signal at the first control input exhibits a first trigger state, and when, subsequently, the signal at the second control input exhibits a second trigger state. In accordance with a second aspect of the invention, this object is achieved by a method for generating random numbers, comprising the following steps: supplying a noise signal; sampling the noise signal when a sampling state is present, and non-sampling the noise signal when an idle state is present; supplying a control alternating signal, the frequency of the control alternating signal not being rigidly coupled to the frequency of the noise signal; signaling a sampling state when the noise signal or the signal derived from the noise signal is in a first trigger state and when, subsequently, the control alternating signal exhibits a second trigger state.

In accordance with a third aspect of the invention, this object is achieved by a smart card having a random number generator, the random number generator comprising: a noise signal generating device for supplying a noise signal; a sampling device connected between an output of the noise signal generating device and an output of the random number generator, the noise signal being sampled when the sampling device is in a sampling state, and the noise signal not being sampled when the sampling device is in an idle state; a control oscillator for supplying an alternating signal at a control oscillator output, the frequency of the alternating signal of the control oscillator not being rigidly coupled to the frequency of the noise signal; an enabling device having a first control input and a second control input and an output, the first control input being arranged to receive the noise signal or a signal derived from the noise signal, the second control input being arranged to receive the oscillator output signal or a signal derived from the same, an output signal being generatable at the output of the enabling device, by which output signal the sampling device is switchable from the idle state to the sampling state, and the enabling device being arranged to generate the output signal when the signal at the first control input exhibits a first trigger state, and when, subsequently, the signal at the second control input exhibits a second trigger state.

The present invention is based on the findings that the functionality of a noise signal generating device, which in most cases exhibits a controllable oscillator, is utilized in an optimum manner when the output signal of the noise signal generating device, i.e. typically the output signal of a controllable oscillator, is used for influencing the frequency of the output signal of the random number generator. It is in particular in those cases where the noise signal generating device comprises a controllable oscillator that frequency control for driving the clock oscillator can be dispensed with either fully or at least in part due to utilization of the control range of such an oscillator, which, after all, already comprises a dynamic range.

It shall be pointed out, however, that even in those cases where the noise signal generating device does not comprise a voltage-controlled oscillator and where the clock oscillator can nevertheless be fully controlled in terms of frequency, an advantage is achieved in that the frequency of the output signal of the random number generator is dependent on the frequency of the output signal of the noise signal generating device, whereas it is merely the instantaneous phase of the output signal of the random number generator that is determined by a control oscillator. Once the control oscillator has no more frequency determination function for the output signal of the random number generator, the requirements made on it with regard to, for example, the stability of the control oscillator, decrease considerably. Thus it is possible, in a low-cost manner, to accommodate, for example on the smart card, even a clock oscillator with simple and therefore low-cost means. No more external terminals are needed for receiving a clock signal from an external circuit, so that the smart card has another input less. It shall be pointed out in this connection that the aim is to provide smart cards with as small a number of inputs and outputs as possible. This is to prevent that a potential attacker who is in full control of the smart card uses, for example, the clock input in some manner so as to run a new attack on the crypto-algorithm. It is in particular the random number generator of the crypto-processor, which is a highly relevant central item of the same in terms of security engineering, that is to be protected as much as possible.

The inventive random number generator includes a noise signal generating device and a sampling device, which is connected between an output of the noise signal generating device and an output of the random number generator, the noise signal being sampled when the sampling device is in a sampling state, the noise signal not being sampled when the sampling device is in an idle state. The random number generator further includes a control oscillator for supplying an alternating signal at a control oscillator output, the frequency of the alternating signal at the control oscillator output not being rigidly coupled to the frequency of the noise signal, ideally being even independent of the noise signal. Finally the random number generator includes an enabling device having a first and a second control input and an output, the first control input being arranged to receive the noise signal or a signal derived from the noise signal, the second control input being arranged to receive the oscillator output signal or a signal derived from the same, and an output signal being producible at the output of the enabling device, through which output signal the sampling device is switchable from the idle state to the sampling state. The enabling logic is designed, in particular, to generate the output signal only when the signal at the first input exhibits a first trigger state and when the signal at the second input subsequently exhibits a second trigger state.

The inventive concept for generating random numbers therefore consists in a frequently repeated, two-stage enabling of the sampling device. The "outer" frame is determined by the noise signal or by a signal derived from the noise signal, whereas the "inner" frame of the sampling is determined by the control oscillator. In other words, this means that a sample is generated for each period of the noise signal or of the signal derived from the noise signal when the frequency of the control oscillator is equal to or larger than the frequency of the noise signal or of the signal derived from the noise signal. Put in other words again, this means that the frequency of the output signal, that is the frequency of the samples, depends on the frequency of the noise signal or on the frequency of the signal derived from the noise signal, however that the instantaneous phase of the samples, that is the position of the samples in a period of the noise signal or of the signal derived from the noise signal is determined by the clock oscillator.

The inventive concept allows utilizing any frequency control functionalities present in the noise signal generating device. If, specifically, the mean frequency of the output samples is to be changed, a VCO, for example, must simply be biased differently in the noise signal generating device.

The randomness of the output samples is improved by the variable instantaneous phase of the control oscillator. As is apparent from the above discussion, the output samples at the output of the random number generator do not exhibit a constant instantaneous frequency, as is the case in the prior art, but a varying instantaneous frequency, which is constant on average only. However, this is of no importance in most cryptographic applications, since it is the sequence of ones and zeros that is important, but not the spacings between the corresponding edges of a digital signal. In cases where the output samples are expected to have a constant frequency, a memory circuit (buffer) may readily be connected downstream of the output of the inventive random number generator so as to homogenize the output samples in terms of frequency.

BRIEF DESCRIPTION OF THE DRAWINGS

Preferred embodiments of the present invention will be explained in detail below with reference to the accompanying drawings, in which.

DESCRIPTION OF THE PREFERRED EMBODIMENTS

Figure 1:
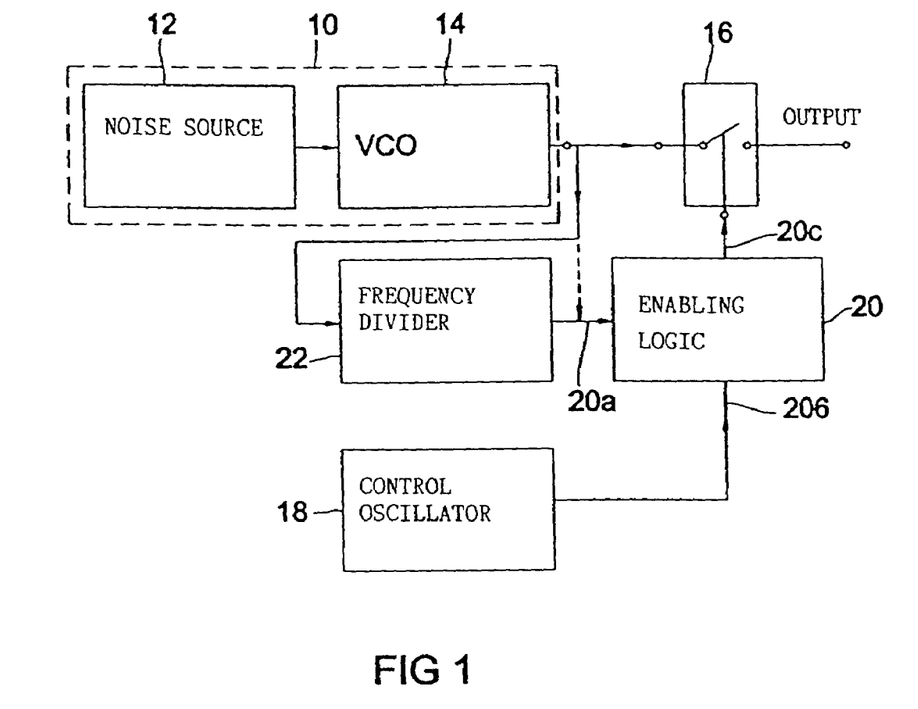
FIG. 1 shows a block diagram of an inventive random number generator.

The inventive random number generator includes a noise signal generating device 10. The noise signal generating device preferably includes a noise source 12 and a controllable oscillator 14 which is embodied as a voltage-controlled oscillator due to the simplicity of the circuit. In principle, however, any other controllable oscillator may be used.

Any circuits may be used as the noise source, such as a resistor that exhibits thermal noise and whose output signal is strongly amplified, a reverse-biased diode whose shot noise is strongly amplified, a transistor exhibiting a lot of noise or an analog or digital circuit which generates an output wave form exhibiting a relatively random course. It shall be pointed out that neither the output signal of the noise source 12 nor the output signal of the VCO 14 must be completely noisy, i.e. distributed completely randomly in terms of statistics. Apart from the fact that it is relatively difficult to generate such wave forms with reasonable means, a certain degree of randomness is also sufficient, however, so that all pseudo noise sources and the like may also be used. It shall be pointed out that, in accordance with the terminology used, the expression "noise signal" is not limited to an ideal noise signal having a probability which is distributed in an optimum manner. Instead, the expression "noise signal" also includes alternating signals that do not exhibit an optimum probability distribution but a certain minimum degree of randomness or non-predictability, which suffices for most applications.

The inventive random number generator further includes a sampling device 16 which is shown, for reasons of representation, simply as a normal switch with an input, an output an a control input in FIG. 1. In the simplest case, the sampling device can take two states, specifically an idle state, where no signal is present at the output of the random number generator (this state is drawn in FIG. 1), or a sampling state which can be shown in that the switch of the device 16 is closed, so that an output signal is present at the output of random number generator.

The inventive random number generator further includes a control oscillator 18 which supplies an alternating signal at an oscillator output, the frequency of the alternating signal of the control oscillator not being rigidly coupled to the frequency of the noise signal..Ideally the alternating signal and the noise signal are independent of each other.

The random number generator shown in FIG. 1 further includes an enabling device 20 which is also referred to as an enabling logic.

The enabling device 20 includes a first input 20a, a second input 20b and an output 20c.

As is shown in FIG. 1, the output of the control oscillator 18 is connected to the second input 20b.

The first input 20a of the enabling logic 20 can either be directly connected to the output of the noise signal generating device 10, as is shown by a dashed line in FIG. 1, or to the output of a frequency divider 22, as is symbolized by means of a continuous line in FIG. 1.

If the first input 20a of the enabling logic 20 is directly connected to the output of the VCO, the enabling logic obtains the noise signal at the output of the noise signal generating device via its first input. If, however, the frequency divider 22 is connected between the output of the noise signal generating device and the first input 20a of the enabling logic, the enabling logic does not, via its first input, directly obtain the noise signal but obtains a signal derived from the noise signal.

It shall be pointed out that the output signal of a typical frequency divider is synchronous with the input signal, however with a frequency lowered correspondingly. The output signal of the frequency divider is thus dependent on the input signal of the frequency divider, it being self-evident that the frequency of the output signal of the frequency divider depends on the frequency of the input signal into the frequency divider.

Figure 2:
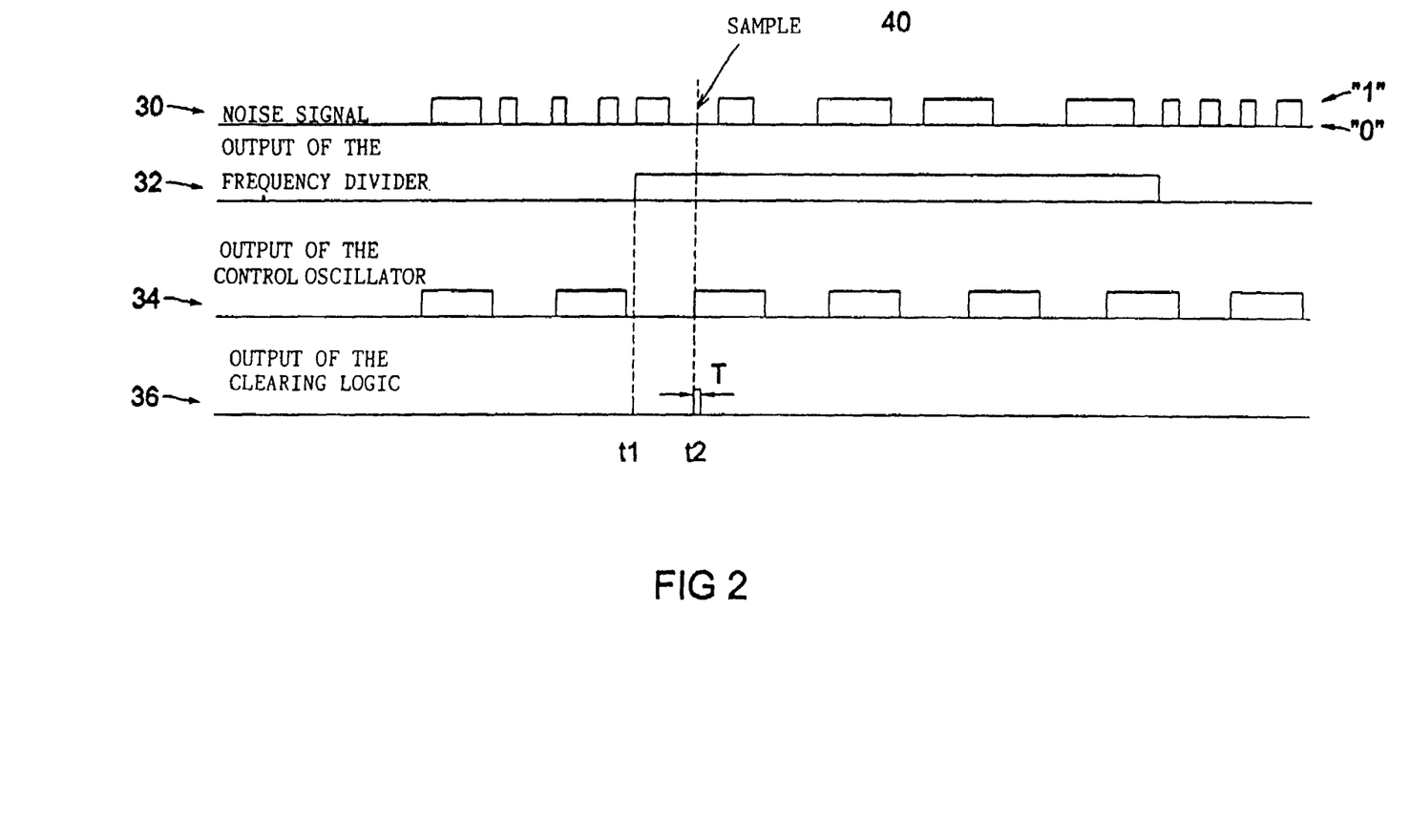
FIG. 2 shows a time diagram for explaining the function of the random number generator shown in FIG. 1.

With reference to FIG. 2, the function of the inventive random number generator will be described below.

In a first line, FIG. 2 shows an exemplary plot of the noise signal. As can be seen from FIG. 2, the noise signal may be a sequence of digital values which may either be a "one" or a "zero". It shall be pointed out that the noise signal does not necessarily have to be a digital noise signal but may just as well be an analog noise signal in which the amplitude of the noise signal varies between a maximum positive value and a maximum negative value with variable frequency.

The output signal of the frequency divider 22 (FIG. 1) is plotted in a second line 32. A third line 34 exhibits the output signal of the control oscillator 18 (FIG. 1), and the output signal of the enabling logic 20 (FIG. 1) is plotted in a last line 36.

Initially, the output signal of the enabling logic is at a value of zero, which means that the sampling device is in its idle state, i.e. no signal is present at the output of the random number generator. This continues to be the case until the output signal of the frequency divider carries out a transition from "zero" to "one" at a time t1. Even then, the output of the enabling logic remains on "zero". This remains to be the case until the output signal of the control oscillator also exhibits a transition from a logical "zero" to a logical "one" at a time t2. Thus the signal at the first input 20a, i.e. the output signal of the frequency divider, exhibits a first trigger state at the time t1. At a time t2, which follows time t1, the signal at the second control input 20b of the enabling logic 20 has also reached its trigger state. Then the output signal of the enabling logic 20c is in a high state which leads to the fact that the sampling device goes to its sampling state, so that a "zero" is output at the output of the random number generator in the example shown in FIG. 2, as is represented by a sample 40 in FIG. 2. In the example shown in FIG. 2, the random number generator thus outputs a "zero" at the output. After a short sampling period, which is referred to by T in FIG. 2, the sampling device 16 (FIG. 1) returns to its idle state, i.e. the switch is reopened, and the random number generator is again ready to output a new sample. Again, this will occur only if the output signal of the frequency divider initially exhibits a positive a positive edge and if the output signal of the control oscillator then also exhibits a positive edge. Provided that the frequency of the control oscillator is lower than the frequency of the output signal of the frequency divider, this goes to show clearly that the random number generator outputs a sample whenever the output signal of the frequency divider is in a logically high state. This in turn means that the mean frequency of the output samples is equal to the frequency of the output signal of the frequency divider, which frequency, as has been discussed, is derived from the frequency of the noise signal. It is apparent from FIG. 2 that, depending on the choice of the frequency of the control oscillator, the sample may be present either immediately after a rising edge of the output signal of the frequency divider or immediately before the falling edge of the output signal of the frequency divider.

The instantaneous phase of the sample, i.e. of the output signal of the noise generator with regard to the output signal of the frequency divider and thus also with regard to the noise signal itself is determined by the control oscillator.

It shall be pointed out that in FIG. 2 a dividing ratio of the frequency divider of 1:5 has been assumed by way of example, the frequency of the control oscillator being clearly larger than the frequency of the output signal of the frequency divider. This means that the output samples of the random number generator are generated merely in a period of the output signal of the frequency divider which is, as a maximum, equal to the period duration of the control oscillator output signal. In this case, a rising edge of the output signal of the control oscillator would have to occur immediately before the rising edge of the output signal of the frequency divider. In this case an output sample is generated as late as at a next rising edge of the output signal of the control oscillator.

Depending on the frequency of the noise signal, any dividing ratios can be set, a dividing ratio of 1:100 being selected in a preferred embodiment of the present invention. In order to be able to use a phase range which is as large as possible with regard to the output signal of the frequency divider, it is further preferred to set the frequency of the output signal of the control oscillator to a value which is several percent above the frequency of the output signal of the frequency divider.

Although it was said in the foregoing that the first trigger state and the second trigger state are each rising edges of the signals concerned, it is also possible, for example, to take falling edges or a rising edge of the one signal and a falling edge of the other signal. If the circuit is operated in an analog manner, a certain, either positive or negative, voltage value or a certain value of the derivation of the voltage as a function of time may also be used as a trigger state instead of the falling edge or the rising edge. This does not lead to any changes in the general mode of operation, any effects caused merely relate to the specific design of the enabling logic, which may be, for example, an arrangement of flip flops, comparators and/or logic gates.

Thus, according to the present invention, a noise generating device is used which preferably comprises a controllable oscillator which is sampled. However, the frequency of the sampling is not established by the control oscillator but is preferably derived from the noise signal at the output of the oscillator by a frequency divider with a constant dividing factor. Alternatively, the frequency division may be dispensed with, so that the noise signal is used immediately for "arming" the enabling logic.

Therefore the signal obtained from the frequency division does not directly trigger the sampling process. Once the frequency division has enabled or "armed" the sampling process, the sampling is triggered by the next edge of the control oscillator, whose frequency is independent of that of the noise signal generating device. Thus the frequency with which sampling is effected is dependent on the frequency of the noise signal generating device. It is merely the phase position of the sequence of output samples with regard to a period duration of the noise signal that is independent of the frequency of the alternating signal at the output of the noise signal generating device.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

noise signal generating device
12 noise source
14 voltage-controlled oscillator
16 sampling device
18 control oscillator
20 enabling device
20a first control input of the enabling device
20b second input of the enabling device
20c output of the enabling device
22 frequency divider
30 noise signal
32 output signal of the frequency divider
34 output signal of the control oscillator
36 output signal of the enabling logic
40 sample
300 analog oscillator
400 digital VCO
500 logic circuit
600 clock oscillator
700 CPU
800 sampling device

What is claimed is:

1. Random number generator comprising:
    a noise signal generating device for supplying a noise signal;
    a sampling device connected between an output of the noise signal generating device and an output of the random number generator, the noise signal being sampled when the sampling device is in a sampling state, and the noise signal not being sampled when the sampling device is in an idle state;
    a control oscillator for supplying an alternating signal at a control oscillator output, the frequency of the alternating signal of the control oscillator not being rigidly coupled to the frequency of the noise signal;
    an enabling device having a first control input and a second control input and an output,
        the first control input being arranged to receive the noise signal or a signal derived from the noise signal,
        the second control input being arranged to receive the oscillator output signal or a signal derived from the same,
        an output signal being generatable at the output of the enabling device, by which output signal the sampling device is switchable from the idle state to the sampling state, and the enabling device being arranged to generate the output signal when the signal at the first control input exhibits a first trigger state, and when, subsequently, the signal at the second control input exhibits a second trigger state.

2. Random number generator as claimed in claim 1, wherein the enabling device is arranged to autonomously generate, after a sampling period, an output signal by which the sampling device is brought into the idle state, or wherein the sampling device is arranged to autonomously return to the idle state after a pre-determined sampling period.

3. Random number generator as claimed in claim 1, wherein the enabling device is arranged to respond to the first trigger state in the form of a rising edge of the signal at the first control input, and to respond to the second trigger state in the form of a rising edge of the signal at the second control input.

4. Random number generator as claimed in claim 1, which further comprises the following:

a frequency divider comprising an input and an output, the input of the frequency divider being coupled to the output of the noise signal generating device, and the output of the frequency divider being coupled to the first control input so as to supply the signal derived from the noise signal to the enabling device, the signal derived from the noise signal having a frequency which, in accordance with a dividing ratio of the frequency divider, corresponds to a fraction of the frequency of the noise signal.

5. Random number generator as claimed in claim 4, wherein the dividing ratio of the frequency divider ranges from 1:50 to 1:150.

6. Random number generator as claimed in claim 4, wherein the frequency of the alternating signal at the control oscillator output is in the order of magnitude of the frequency of the signal derived from the noise signal.

7. Random number generator as claimed in claim 4, wherein the frequency divider comprises a digital counter.

8. Random number generator as claimed in claim 1, wherein the noise signal generating device comprises the following:

a noise source having an output for supplying a noisy wave form; and a controllable oscillator having a control input and a signal output, the output of the noise source being connected to the control input of the controllable oscillator.

9. Random number generator as claimed in claim 1, wherein the noise signal generating device supplies a digital noise signal.

10. Random number generator as claimed in claim 1, wherein the noise signal or the signal derived from the noise signal comprises a highest and a lowest frequency, and wherein the frequency of the alternating signal of the control oscillator is larger than the lowest frequency of the noise signal or of the signal derived from the noise signal.

11. Method for generating random numbers, comprising the following steps:

supplying a noise signal;

sampling the noise signal when a sampling state is present, and non-sampling the noise signal when an idle state is present;

supplying a control alternating signal, the frequency of the control alternating signal not being rigidly coupled to the frequency of the noise signal;

signaling a sampling state when the noise signal or the signal derived from the noise signal is in a first trigger state and when, subsequently, the control alternating signal exhibits a second trigger state.

12. Smart card having a random number generator the random number generator comprising:

a noise signal generating device for supplying a noise signal;

a sampling device connected between an output of the noise signal generating device and an output of the random number generator, the noise signal being sampled when the sampling device is in a sampling state, and the noise signal not being sampled when the sampling device is in an idle state;

a control oscillator for supplying an alternating signal at a control oscillator output, the frequency of the alternating signal of the control oscillator not being rigidly coupled to the frequency of the noise signal;

an enabling device having a first control input and a second control input and an output, the first control input being arranged to receive the noise signal or a signal derived from the noise signal, the second control input being arranged to receive the oscillator output signal or a signal derived from the same, an output signal being generatable at the output of the enabling device, by which output signal the sampling device is switchable from the idle state to the sampling state, and the enabling device being arranged to generate the output signal when the signal at the first control input exhibits a first trigger state, and when, subsequently, the signal at the second control input exhibits a second trigger state.

* * * * *

UNITED STATES PATENT AND TRADEMARK OFFICE
CERTIFICATE OF CORRECTION

PATENT NO.        : 7,117,233 B2                                              Page 1 of 1
APPLICATION NO.   : 10/611065
DATED             : October 3, 2006
INVENTOR(S)       : Markus Dichtl It is certified that error appears in the above-identified patent and that said Letters Patent is hereby corrected as shown below:

Title page, item (63) add
Related U.S. Application Data (63)   Continuation of application No. PCT/EP02/00732, filed on Jan. 24, 2002.

Title page, Item (30) should read as follows:

(30)       Foreign Application Priority Data
  Jan. 24, 2001        (DE)..........................................101 03 071

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,117,233 B2 Page 1 of 1
APPLICATION NO. : 10/611065
DATED : October 3, 2006
INVENTOR(S) : Markus Dichtl It is certified that error appears in the above-identified patent and that said Letters Patent is hereby corrected as shown below:

Column 1 Line 4-9, between the title and the subheading "BACKGROUND OF THE INVENTION" the following paragraph is inserted:

-- CROSS-REFERENCE TO RELATED APPLICATION

This application is a continuing application, under 35 U.S.C. §120, of international application PCT/EP02/00732, filed January 24, 2002, which designated the United States; this application also claims the priority, under 35 U.S.C. §119, of German patent application DE 101 03 071.1, filed January 24, 2001. --

Signed and Sealed this

Fifteenth Day of September, 2009

David J. Kappos
*Director of the United States Patent and Trademark Office*